United States Patent [19]
Zoursel

[11] 4,088,398
[45] May 9, 1978

[54] DEVICE FOR THE SIMULTANEOUS CONTROL OF THE DRIVING-MIRRORS OF AN AUTOMOBILE VEHICLE

[75] Inventor: Pierre Edouard Zoursel, Malakoff, France

[73] Assignee: Automobiles Peugeot, Paris, France

[21] Appl. No.: 737,020

[22] Filed: Oct. 29, 1976

[30] Foreign Application Priority Data
Dec. 3, 1975   France ............................. 75 36961

[51] Int. Cl.² .......................... B60R 1/04; B60R 1/06; G02B 17/00
[52] U.S. Cl. ..................................... 350/280; 350/289
[58] Field of Search ............... 350/280, 281, 282, 283, 350/289

[56] References Cited
U.S. PATENT DOCUMENTS

| | | | |
|---|---|---|---|
| 2,126,059 | 8/1938 | Turner | 350/283 X |
| 3,522,583 | 8/1970 | Russell | 350/289 UX |
| 3,664,729 | 5/1972 | Moore | 350/283 X |
| 3,680,951 | 8/1972 | Jordan et al. | 350/289 X |

*Primary Examiner*—John K. Corbin
*Assistant Examiner*—Matthew W. Koren
*Attorney, Agent, or Firm*—Burns, Doane, Swecker & Mathis

[57] ABSTRACT

A device for controlling simultaneously at least one outside driving-mirror and an inside driving mirror of a vehicle. The inside and outside driving-mirrors each comprise two surfaces having different reflecting powers. At least the surface having the maximum reflecting power being capable of being put into two distinct angular positions. A manual control puts the surface of maximum reflecting power of the inside driving-mirror into either of its angular positions. an electromagnet associated with the surface having maximum reflecting power of the outside driving-mirror puts this surface in either of its two angular positions. The electromagnet is inserted in a circuit controlled by the movements of the manual control so that the two surfaces having maximum reflecting power are put into identical positions simultaneously.

5 Claims, 2 Drawing Figures

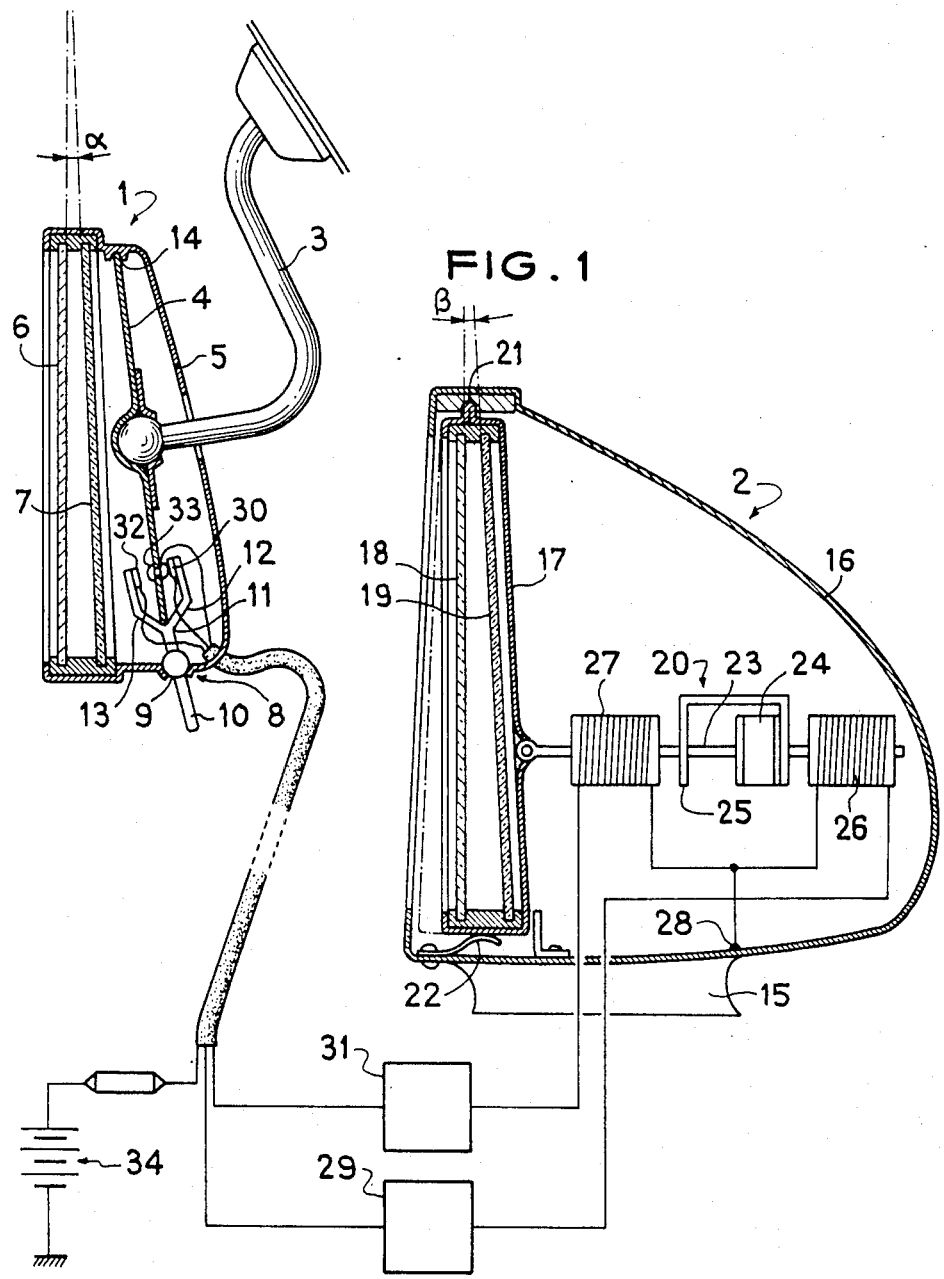

DEVICE FOR THE SIMULTANEOUS CONTROL OF THE DRIVING-MIRRORS OF AN AUTOMOBILE VEHICLE

The present invention relates to driving-mirrors for automobile vehicles and more particularly to driving-mirrors provided with a day-time reflector and a night-time reflector.

It is known that for the night-time driving of automobile vehicles it is particularly troublesome for the driver to receive in his eyes the light which comes from the head-lamps of the following vehicles and is reflected by the driving-mirrors. This is why "day-night" driving-mirrors have been proposed which comprise two surfaces having different reflecting powers, at least the surface having the maximum reflecting power being capable of occupying two distinct angular positions.

For driving in the day, it is the surface having the maximum reflecting power which is employed. For driving at night, the plane of this surface is angularly offset slightly and it is then the surface having the minimum reflecting power which is employed. But this arrangement is in practice only applicable to inside driving-mirrors, the outside driving-mirrors continuing to reflect in the eyes of the driver the light of the head-lamps of the vehicles at the rear.

An object of the present invention is to overcome this drawback by means of a simple device which permits the passage in a single operation, from the "day" position to the "night" position, or inversely, of both the outside driving-mirror or driving-mirrors and the inside driving-mirror.

According to the invention, there is provided a device for simultaneously controlling at least one outside driving-mirror and an inside driving-mirror of an automobile vehicle, said inside driving-mirror comprising two surfaces having different reflecting powers, at least the surface having the maximum reflecting power being capable of being put into two distinct angular positions by the action of a manual control means, wherein each outside driving-mirror comprises two surfaces having different reflecting powers, at least the surface having the maximum reflecting power of the outside driving-mirror being capable of being put into two distinct angular positions by the action of an electromagnet supplied with current by a circuit comprising a switch associated with the manual control means of the inside driving-mirror.

According to a first embodiment, said electromagnet has two coils which act in opposite directions and are each supplied with current in a respective position of the manual control means of the inside driving-mirror through a timing device having an automatic current cut-off.

According to another embodiment, said electromagnet comprises a coil associated with two coupled reversing switches, said switches being directly connected to the terminals of said switch associated with said manual control means.

Further features and advantages of the invention will be apparent from the ensuing description with reference to the accompanying drawings which are given solely by way of example and in which:

FIG. 1 is a diagrammatic view of a first embodiment of a driving-mirror assembly according to the invention, and FIG. 2 is a partial diagram of a second embodiment of the invention.

FIG. 1 shows an inside driving-mirror 1 and outside driving-mirror 2. The inside driving-mirror 1 comprises a fixing arm 3, a plate 4, a case 5, two mirrors 6, 7 and a manual control means 8. The mirror 6 has a very low reflecting power and the mirror 7 has a high reflecting power. The two mirrors 6 and 7 are fixed in the case 5 in such manner as to make therebetween an angle $\alpha$ of a few degrees. The manual control means 8 is mounted on the case 5 to pivot about a pin 9. It comprises a finger member 10 outside the case 5 and a fork member 11 having two branches 12, 13 inside the case 5. The plate 4 is mounted to be gripped between a recess 14 formed in the upper part of the case 5 and the bottom of the fork member 11 so that the control means can occupy only two stable positions with either one of the branches 12, 13 bearing on the plate 4. The passage from one to the other position offsets the whole of the plate 5 by an angle $\alpha$ equal to the angle between the planes of the reflecting surfaces 6 and 7.

The outside driving-mirror 2 comprises a fixing foot 15, a case 16, a frame 17 in which two mirrors 18, 19 are fixed, and an electromagnet 20. The mirror 18 has a very low reflecting power and the mirror 19 has a high reflecting power. The two mirrors 18, 19 make therebetween an angle $\beta$ of a few degrees. The frame 17 is mounted to be gripped between a recess 21 formed in the upper part of the case 16 and a spring 22 fixed in the lower part of the case. The frame 17 is connected by its rear face to a rod 23 which is part of a moving part of an electromagnet 20. Fixed on the rod is a permanent magnet 24 constituted by a disc of ferrite which is magnetized axially and is capable of moving between the two branches of a support 25. The rod 23 extends through two coils 26, 27 disposed on each side of the support 25.

The coil 26 is connected to earth at 28 and, through a timing device 29, to a contact 30 carried by the branch 12 of the control means 8 of the inside driving-mirror 1. The coil 27 is connected to earth at 28 and, through a timing device 31, to a contact 32 carried by the branch 13 of the control means 8.

The contcts 30 and 32 cooperate, alternately, with a contact 33 fixed to the plate 4 and connected to a source of current 34 constituted by the battery of the vehicle.

The assembly just described operates in the following manner:

FIG. 1 shows the two driving-mirrors in the night positions in which the mirrors 6 and 18 respectively enable the driver to view the rod at the rear of the vehicle.

If the control means 8 is shifted, it moves the whole of the case 5 and the mirror 7 takes up exactly the orientation which was previously that of the mirror 6. At the same time, the contact 32 closes on the contact 33 and this supplies current to the coil 27. The magnet 24 is then attracted and this drives the whole of the moving part which causes the frame 17 to tilt: the mirror 19 assumes the orientation which was previously that of the mirror 18.

The two driving-mirrors then occupy the day position and, at the end of a few seconds, the timing device 31 cuts off the supply of current to the coil 27 so that it does not continue to carry current.

The return to the night position occurs by bringing the control means to its initial position.

FIG. 2 shows a modification of the electromagnet which actuates the outside driving-mirror.

In this modification, which is moreover otherwise identical to the embodiment shown in FIG. 1, a single coil 35 is associated with two reversing switches 36 and 37, the moving contacts of which are respectively connected to the terminls of the coil 35.

A fixed contact of each reversing switch is connected to earth, the other two fixed contacts being respectively connected to the contacts 30 and 32 carried by the fork member 11 (FIG. 1).

In the modification, there is no need to provide timing devices for cutting off the current, since this is effected in the known manner by the operation of the reversing switches 36 and 37 which is the result of the displacement of the moving part.

Having now described my invention what I claim as new and desire to secure by Letters Patent is:

1. A device comprising at least one outside driving-mirror and an inside driving-mirror of an automobile vehicle, said inside driving-mirror comprising means defining two surfaces having different reflecting powers, at least the surface having the maximum reflecting power being capable of being put into two distinct angular positions, a manual control means for shifting the surface having maximum reflecting power between said two angular positions, said outside driving-mirror comprising means defining two surfaces having different reflecting powers, at least the surface having the maximum reflecting power of the outside driving-mirror being capable of being put into two distinct angular positions, electromagnetic shifting means connected to the surface having maximum reflecting power of the outside driving-mirror for shifting it between said two angular positions thereof, a circuit for connection to a source of current and connected to the electromagnetic shifting means for supplying current to the electromagnetic shifting means and switching means inserted in said circuit and associated with said manual control means for actuating said electromagnetic shifting means in either of two directions simultaneously with actuation of said manual control means in either of two directions.

2. A device as claimed in claim 1, wherein said electromagnetic shifting means comprise two coils which are operative in opposite directions and are each supplied with current in a respective position of said manual control means, a timing device being inserted in said circuit and associated with each coil and operative to produce automatic cut off of the current supply.

3. A device as claimed in claim 1, wherein said electromagnetic shifting means comprise a core and two coupled reversing switches associated with the core and directly connected to said switching means associated with said manual control means.

4. A device as claimed in claim 1, wherein said outer driving-mirror comprises a case, a frame which is pivotably mounted in the case, a rod pivoted to a side of the frame opposed to the reflecting surfaces, a permanent magnet carried by the rod and forming an armature of said electromagnet and a support having two branches which constitute stops, the permanent magnet being movable in translation between two extreme positions of abutment with said stops.

5. A device as claimed in claim 1, wherein said inside driving-mirror comprises a case defining a recess, a support which extends through the case, a plate pivotably mounted on the support and swingable about said recess, said manual control means being pivotable in a wall of the case and comprising an inner fork member and an outer finger member, an end of said plate opposed to said recess being engaged between the branches of said fork member, said switching means comprising first contacts which are each carried by a branch of said fork member and a second contact carried by said plate and respectively cooperative with said first contacts.

* * * * *